(12) United States Patent
Moreau et al.

(10) Patent No.: US 9,952,005 B2
(45) Date of Patent: Apr. 24, 2018

(54) HEAT EXCHANGER MANIFOLD AND A HEAT EXCHANGER EQUIPPED WITH SUCH A MANIFOLD

(75) Inventors: Laurent Moreau, Versailles (FR); Francois Beideler, Reims (FR)

(73) Assignee: VALEO SYSTEMES THERMIQUES, Le Mesnil, Saint Denis (FR)

( * ) Notice: Subject to any disclaimer, the term of this patent is extended or adjusted under 35 U.S.C. 154(b) by 639 days.

(21) Appl. No.: 13/807,462

(22) PCT Filed: Jun. 21, 2011

(86) PCT No.: PCT/EP2011/060353
§ 371 (c)(1),
(2), (4) Date: Aug. 13, 2013

(87) PCT Pub. No.: WO2012/000844
PCT Pub. Date: Jan. 5, 2012

(65) Prior Publication Data
US 2013/0319644 A1 Dec. 5, 2013

(30) Foreign Application Priority Data
Jun. 30, 2010 (FR) ..................................... 10 02779

(51) Int. Cl.
*F28F 9/16* (2006.01)
*F28F 9/02* (2006.01)
(Continued)

(52) U.S. Cl.
CPC .............. *F28F 9/02* (2013.01); *F28F 9/0224* (2013.01); *F28F 9/0248* (2013.01);
(Continued)

(58) Field of Classification Search
CPC .......... F28F 9/02; F28F 9/0224; F28F 9/0246; F28F 9/0248; F28F 9/0251; F28F 9/04;
(Continued)

(56) References Cited

U.S. PATENT DOCUMENTS

| 4,680,845 A * | 7/1987 | Miller .................... F28F 9/0243 165/173 |
| 4,956,989 A * | 9/1990 | Nakajima ............ B21D 19/088 72/327 |

(Continued)

FOREIGN PATENT DOCUMENTS

| DE | 4232018 A1 * | 3/1994 | ............. B60K 11/04 |
| DE | 4435111 A1 * | 4/1996 | ........... B23K 1/0012 |

(Continued)

OTHER PUBLICATIONS

English language abstract and translation for DE 102006040848 extracted from espacenet.com database on Aug. 22, 2013, 12 pages.

(Continued)

*Primary Examiner* — Leonard R Leo
(74) *Attorney, Agent, or Firm* — Howard & Howard Attorneys PLLC

(57) ABSTRACT

Header for a heat exchanger and resulting heat exchanger are disclosed. The tubular header is of the type which can receive at least one connecting flange (5, 6) with an internal fluid passage (25), and is composed of: a header plate (8) with a longitudinally open wall, provided with slots intended to receive parallel fluid flow tubes; and a cover (9) which, after assembly, closes a longitudinal opening of said header plate, the wall of this cover having at least one external collar (28) delimiting a hole for the flow of fluid (27), said connecting flange (5, 6) being attached to said cover (9) and being configured in such a way that it can be crimped onto the header (3, 4), thereby bringing the internal passage (25) into fluid communication with the hole (27) in said collar. Advantageously, said collar (28) has a wall thickness (33) which is reduced relative to that of said cover (9) from which the collar extends, thereby maximizing the cross section of (Continued)

said hole (27) for the flow of fluid toward the internal passage (25) of said flange.

10 Claims, 1 Drawing Sheet

(51) Int. Cl.
| | | |
|---|---|---|
| *F16L 41/08* | (2006.01) | |
| *F28F 9/00* | (2006.01) | |
| *F28D 1/053* | (2006.01) | |

(52) U.S. Cl.
CPC ......... *F16L 41/082* (2013.01); *F28D 1/05366* (2013.01); *F28F 9/00* (2013.01); *F28F 9/162* (2013.01)

(58) Field of Classification Search
CPC ........ F28F 9/16; F28F 2275/122; F28F 9/162; F28F 2280/00; F28F 2280/08; F28D 1/05366; F16L 41/082; F16L 41/12
USPC ................................... 165/173, 175, 178, 78
See application file for complete search history.

(56) References Cited

U.S. PATENT DOCUMENTS

| | | | | | |
|---|---|---|---|---|---|
| 5,107,926 | A | * | 4/1992 | Calleson | ............ F28D 1/05383 |
| | | | | | 165/173 |
| 5,297,624 | A | * | 3/1994 | Haussmann | ............ F25B 39/04 |
| | | | | | 165/173 |
| 5,607,012 | A | * | 3/1997 | Buchanan | ............. F28F 9/0212 |
| | | | | | 165/173 |
| 7,413,006 | B2 | * | 8/2008 | DeGroot | .................... F28F 9/04 |
| | | | | | 165/173 |
| 2007/0131392 | A1 | * | 6/2007 | Minami | ................ F28D 1/0391 |
| | | | | | 165/110 |
| 2008/0289807 | A1 | * | 11/2008 | Auchter | ................ F28F 9/0246 |
| | | | | | 165/178 |
| 2009/0120628 | A1 | * | 5/2009 | Jimenez | .................. F25B 39/04 |
| | | | | | 165/178 |
| 2010/0038063 | A1 | | 2/2010 | Saumweber et al. | |

FOREIGN PATENT DOCUMENTS

| | | | | |
|---|---|---|---|---|
| DE | 102006040848 A1 | * | 3/2007 | ......... F28D 1/05383 |
| EP | 1780489 A1 | | 5/2007 | |
| FR | 2791766 A1 | | 10/2000 | |
| FR | 2951817 A1 | * | 4/2011 | .............. F28F 9/002 |

OTHER PUBLICATIONS

English language abstract and translation for EP 1780489 extracted from espacenet.com database on Aug. 22, 2013, 9 pages.
English language abstract and translation for FR 2791766 extracted from espacenet.com database on Aug. 22, 2013, 9 pages.
International Search Report for Application No. PCT/EP2011/060353 dated Sep. 2, 2011, 7 pages.

* cited by examiner

HEAT EXCHANGER MANIFOLD AND A HEAT EXCHANGER EQUIPPED WITH SUCH A MANIFOLD

RELATED APPLICATIONS

This application is the National Stage of International Patent Application No. PCT/EP2011/060353, filed on Jun. 21, 2011, which claims priority to and all the advantages of French Patent Application No. FR 10/02779, filed on Jun. 30, 2010, the content of which is incorporated herein by reference.

BACKGROUND

The present invention relates to a header or header box for a heat exchanger and to a heat exchanger provided with this header.

The heat exchangers in question are intended, although not exclusively, to be fitted to vehicles, and in a preferred application they form the condensers provided in the air conditioning loops or circuits of vehicles, or the radiators provided in the cooling loops or circuits of engines. However, other applications of these heat exchangers may also be envisaged without departure from the scope of the invention.

Generally, a heat exchanger for a heat loop of this type comprises a bundle of parallel tubes and two headers to which the corresponding ends of the parallel tubes are connected in a fixed and sealed way. Thus the fluid, for example the coolant used in the loop, can flow through the tubes from the upstream header, facing the compressor, toward the downstream header, facing the expander, the fluid being made to pass from the vapor phase to the liquid phase by the external forced air flow which sweeps the tubes whose surface area, increased by the addition of disrupters or dividers in the tubes and/or between the tubes, optimizes the heat exchange.

In the present case, the exchangers are of the type produced by brazing, and the headers used may be designed in two parts, being known as "two-part headers" or "two-part header boxes".

This type of header, which has a tubular overall shape, includes:

a header plate with a longitudinally open wall, provided with slots intended to receive the corresponding ends of the parallel fluid flow tubes; and a cover which, after assembly, closes the longitudinal opening of the header plate, and which has a wall including at least one external collar delimiting a hole for the flow of fluid.

Additionally, a connecting flange is attached to the header in a known way in order to provide a connection between the header and a conduit leading to the expander or compressor of the loop concerned. In particular, the connecting flange has an inner fluid passage which is made to face the hole in the header provided for this purpose, and the flange generally surrounds the external collar of the cover. The flange is fastened by crimping, the edges of the header plate being bent onto the corresponding edges of the flange which rests on the cover. The exchanger is placed in a brazing furnace to ensure that, notably, the header plates, the header covers and flanges, and the tubes are assembled together and sealed.

Other flanges may also be fitted on these headers, such as flanges for fastening the exchanger to supporting parts of the vehicle, including, notably, other adjacent exchangers or the chassis of the vehicle.

Satisfactory results are obtained in this way, notably because of the collar which enables the flange to be positioned and brazed as a result of the provision of coating on the collar, and because of the crimping of the whole assembly, but this solution using a collar also gives rise to problems regarding the efficiency of the exchanger.

This is because the double thickness of the collar wall measured along the diameter tends to significantly reduce the available passage cross section. Consequently there is an increased pressure drop at this point.

This becomes more critical in the aforesaid case of a condenser-type exchanger in which the flange is crimped between the cover and the bent edges of the header plate of each header. Therefore, since the inside diameter of the collar, that is to say the diameter of the hole for the flow of coolant, is restricted by the width of the header (which cannot be increased, owing to unavoidable space constraints), or, in other words, is determined by the crimping width of the two edges of the plate which are bent toward one another, by the two thicknesses of the flange delimiting the passage, and by the two diametric thicknesses of the wall of the collar which extends from the cover, the cross section of the hole in the collar is limited.

SUMMARY OF THE INVENTION

The object of the present invention is to overcome this drawback. For this purpose, the header for a heat exchanger according to the invention is of the type which can receive at least one connecting flange with an internal fluid passage and which comprises a cover which, after assembly, closes a longitudinal opening of a header plate which interacts with said cover to form the header which is, notably, made in tubular form. The wall of said cover has at least one external collar delimiting a hole for the flow of fluid, said header being configured to allow said flange to be crimped onto said cover, thereby bringing the internal passage into fluid communication with the hole in said collar. In other words, said flange is intended to be attached to said cover.

Said header plate is, for example, provided with slots intended to receive parallel fluid flow tubes.

According to the invention, said collar has a wall thickness smaller than that of said cover from which the collar extends, thereby maximizing the cross section of said hole for the flow of fluid toward and/or away from the internal passage of said flange.

Thus the deliberate reduction of the wall thickness at the collar increases the cross section of the hole, which becomes closer to that of the internal passage of the flange, thereby limiting the degradation in terms of internal pressure drops.

For example, the reduction of thickness of the wall of the collar is at least 30% relative to the thickness of the wall of said cover. Preferably, the reduction of thickness of the collar wall is between 50% and 80% relative to the thickness of the wall of said cover.

Thus, with this reduction in thickness, the increase in overall pressure drop due to the difference between the cross sections of the collar hole and the flange passage is limited to between 5% and 10%. When reduced in this way, the collar thickness is nevertheless sufficient to maintain the mechanical strength characteristics of the header relative to the flange. A reduction in the collar wall of more than 80% of the thickness of the remaining wall of the cover would weaken the header in the area of the collar.

Preferably, the flange is crimped by using the parallel edges delimiting the longitudinal opening of the header plate, which are bent onto the corresponding edges provided on said flange attached to said cover.

In particular, in order to position the cover appropriately in the header plate, the wall of the latter is provided with internal stops against which the longitudinal edges of said cover bear after assembly, to seal the longitudinal opening of the header plate.

Advantageously, the cross section of said header plate is substantially U-shaped, its opening being engaged by said cover adapted to receive said connecting flange.

According to another characteristic, the outer face of the wall of said cover is provided with a coating for use in the subsequent brazing of said cover with said header plate and said flange.

The invention further relates to a heat exchanger of the type comprising two headers interconnected by a bundle of parallel fluid flow tubes. At least one of said headers is as defined above.

BRIEF DESCRIPTION OF THE DRAWINGS

The attached figures will clearly show how the invention can be applied. In these figures, identical references denote similar elements.

DETAILED DESCRIPTION

Figure 1:
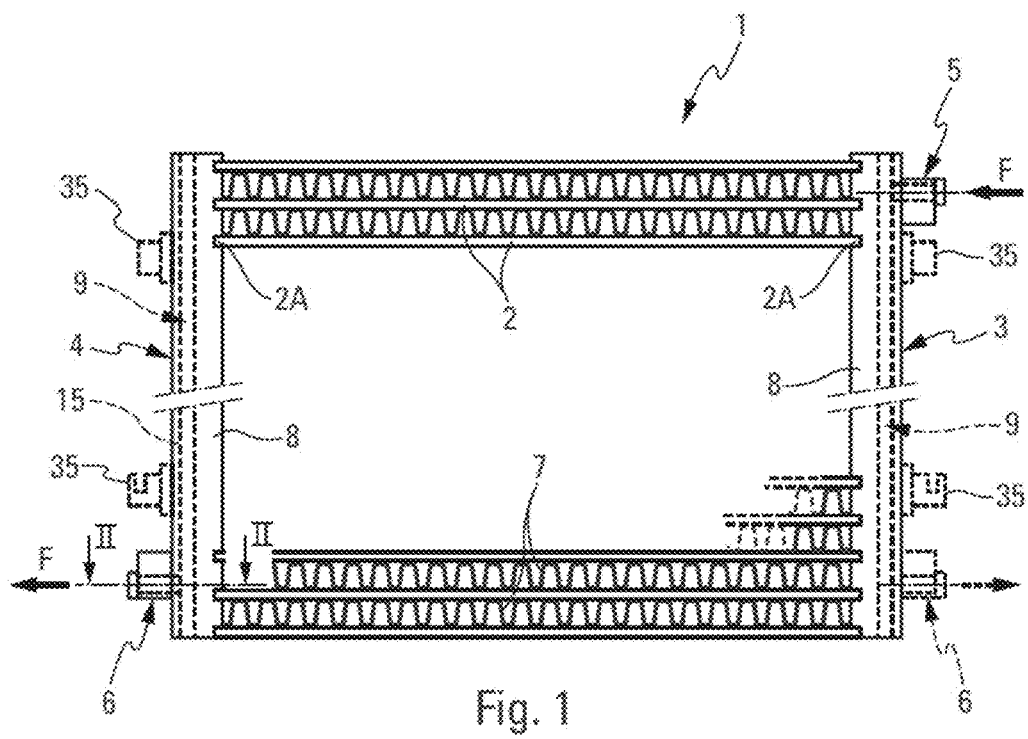
FIG. 1 is a schematic plan view of an exemplary embodiment of a heat exchanger in which the headers are provided with fluid connecting flanges according to the invention.

The heat exchanger 1 shown in FIG. 1 may be, for example, the condenser or the radiator of an air conditioning loop for the interior of a vehicle, or of an engine cooling loop of the vehicle.

In structural terms, the exchanger 1 comprises, in a known way, a bundle of parallel tubes 2 whose ends 2A are connected in a fixed and sealed way to the upstream and downstream headers or header boxes, numbered 3 and 4 respectively, in the direction of flow of the working fluid F flowing in the loop in question. An inlet fluid connecting flange 5 and an outlet fluid connecting flange 6 are attached to these headers respectively, as described below.

In particular, the tubes 2 in which the fluid flows have an oblong cross section, and dividers 7 are arranged between them, thereby increasing the surface for heat exchange between the fluid flowing in the exchanger 1 and the external air flow passing through the exchanger. The inside of the tubes 2 may also include disrupters which, like the dividers, increase the heat exchange surface and also the mechanical strength of the tubes. Extruded tubes may also be used. Each tube forms, for example, a plurality of parallel internal channels for the flow of fluid.

Figure 2:
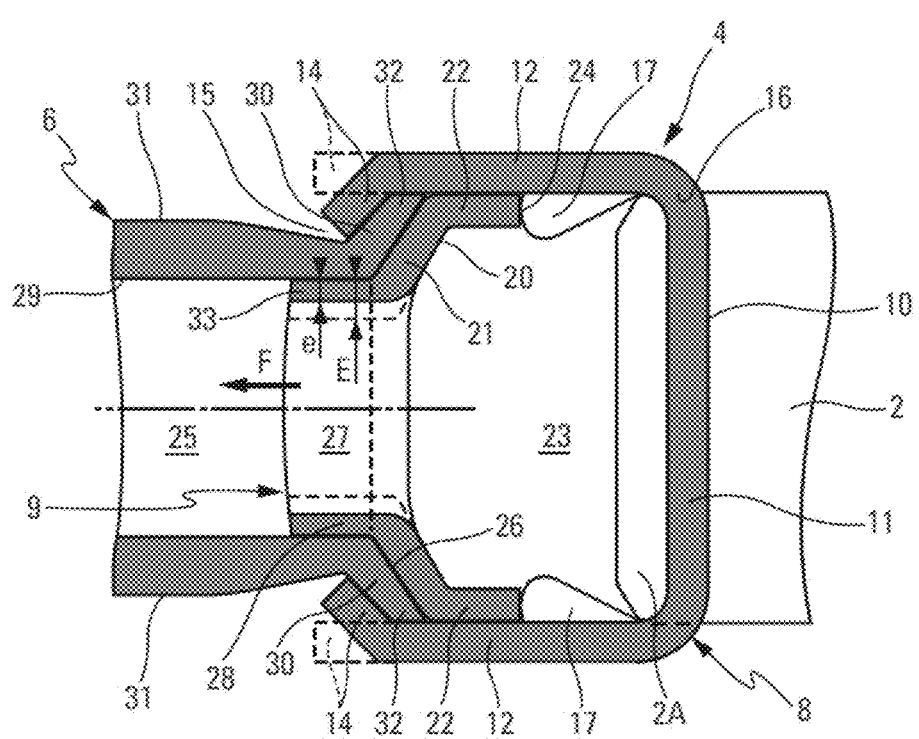
FIG. 2 is a partial enlarged cross section taken along the line II-II in FIG. 1, which passes through the hole in the collar of the header concerned and the internal passage of the associated fluid connecting flange.

The upstream header 3 and downstream header 4 are identical overall and are of generally tubular shape. They are of the "two-part" type; that is to say, each of them is composed of a header plate 8 and a sealing cover 9. As shown in FIG. 2, the header plate 8 has a cross section substantially in the form of a rounded U-shape, and its wall 10 thus defines a base 11 extended by two parallel lateral wings or branches 12 whose terminal edges 14 delimit a longitudinal opening 15 which is filled by the cover in the figure. Oblong slots 16, which receive the corresponding ends 2A of the parallel tubes 2, are formed in the base 11 of the header plate 8 along the length of the plate. It can be seen in FIG. 2 that the end 2A of the tube which is represented passes through the slot 16 until it meets lateral stops 17 which project into the header from the lateral branches 12 of the U-shaped header plate.

The cover 9 also has a substantially U-shaped cross section, with a wall 20 forming a gently concave base 21 extended by parallel lateral branches or wings 22 which are shorter than those of the header plate 8. The size, notably in terms of the width of the sealing cover, is such that the lateral branches 22 are fitted in a head-to-tail arrangement between the lateral branches 12 of the header plate 8. Here again, the terminal edges 24 of the branches 22 of the cover 9 bear against the two projecting stops 17 provided inside the header plate 8, but on the side opposite that on which the ends 2A of the tubes 2 are located.

The assembly of the cover 9 and the header plate 8 forms an internal space 23 in which the working fluid of the loop is made to flow. It should be noted that, in the illustrated example, the base 21 of the cover 9 is located, after assembly, behind the terminal edges 14 of the plate 8. The cross section of the header 3 or 4 is therefore approximately rectangular as a result of the nested U-shape of the plate 8 and the cover 9, but could be different. Partitions (not shown) are provided at each of the longitudinal ends of the header to seal the header.

FIG. 2 shows the fluid connecting flange known as the outlet flange 6 of the exchanger 1, but clearly the flange in question could be the fluid connecting flange known as the inlet flange 5, without departure from the scope of the invention, since the flanges 5, 6 are structurally and functionally similar. In the same way, although the inlet flange 5 and outlet flange 6 have been shown on the upstream and downstream headers respectively, the two flanges 5, 6 could be located, notably in the case of headers with internal separating partitions, on the same tubular header 5 and at respective ends thereof, as shown by the flange 6 depicted in broken lines in FIG. 1.

The function of these inlet and outlet flanges is to provide a fluid connection, through conduits which are not shown, between, in the example, the compressor of the loop in question, facing the upstream header 3, and the internal space of the upstream tubular header 3, and between the internal space 23 of the downstream tubular header 4 and the expander facing it, through fluid passages 25 formed in the flanges.

For this purpose, as can be seen, the flanges are of generally parallelepipedal shape, each having one face 26, on which the corresponding fluid passage 25 opens, which is intended to be fitted by a positive connection onto the outside of the base 21 of the cover 9; to be put into communication with a hole 27 formed in a collar 28 of the cover; and finally to be held there by the header plate. The collar 28 is provided on the base 21 of the cover, in a central position for example.

In the case of the outlet connecting flange 6 shown partially in FIG. 2, and bearing in mind that the same description applies to the inlet connecting flange 5, the end face 26 of the parallelepipedal flange 6 is inserted into the longitudinal opening 15, between the edges 14 of the header plate 8, which are still within the extension of the branches as shown in broken lines, and in such a way that the cylindrical wall 29 delimiting the fluid passage 25 of the flange 6 engages around the cylindrical collar 28 extending perpendicularly from the base 21 of the cover. Thus the centering and correct positioning of the flange 6 on the cover 9 is ensured. It should be noted that the parallel lateral edges 30 of the contact face 26 of the flange matches the shape of the concave base 21 of the cover as closely as possible, in such a way that it can also fit between the parallel branches 12 of the U-shaped header plate 8. These parallel lateral edges 30 form outwardly projecting lips 32 along the whole of the flange 6 relative to the large parallel transverse faces 31 from which they originate, these lips enabling the flange to be crimped onto the tubular header 4 as a result of the bending of the terminal edges 14 of the lateral parallel branches 12 of the header plate 8 onto the terminal edges 30 in the form of projecting lips 32 of the flange. The flange is thus immobilized between the base 21 of the cover 9 and the bent edges 14 of the header plate 8, the hole 27 in the collar 28 and the internal passage 25 of the flange 6 being coaxial at this point.

In order to reduce the pressure drop created by the change between the cross section of the hole 27 in the collar and that of the passage 25 of the flange, the thickness e of the wall 33 of the collar extending from the cover is reduced from the thickness E of the rest of the wall 20 of the cover, in other words the wall of the base and parallel lateral branches of the cover. The wall thickness is reduced by any appropriate mechanical operation (stretching, swaging, etc.).

Thus, as can be seen in FIG. 2, the reduction of thickness of the wall 33 of the collar 28 is of the order of 50%, although it may be as much as 70% or even 80% without any risk of weakening the resulting joint. The thickness E of the collar before reduction (corresponding to the wall 20) is shown in broken lines; consequently the cross section of the hole 27 is optimized to allow the fluid to flow (as shown by the arrow F) from the space 23 through the flange 6 with a smaller pressure drop, which ultimately improves the efficiency of the loop.

Results have shown that, if there is no reduction of the collar wall thickness, the increase in the overall internal pressure drop is between 20% and 30%, which is particularly detrimental.

However, when the diameter of the collar hole 27 is brought as close as possible to the diameter of the internal passage 25 of the flange by a reduction in the collar wall thickness according to the invention, the increase in the overall internal pressure drop is limited to between 5% and 10%, which is acceptable.

The seal between the flange 6 and the cover 9 is provided by a coating (not shown) which is deposited around the outside of the collar wall and which joins this wall to the flange by brazing, while other coatings are provided between the facing branches of the header plate and the cover, and between the tube ends and the oblong slots.

For information, FIG. 1 shows other flanges, identified by the reference 35, which are attached to the tubular headers 3, 4 by crimping in the same way, and which are intended for fixing the exchanger 1 to appropriate supports of the vehicle and for the attachment of a fluid storage bottle in fluid communication with one of the headers.

The invention claimed is:

1. A header for a heat exchanger comprising at least one connecting flange with an internal fluid passage and having one end with an edge extending at an angle relative to an axis of said at least one connecting flange, a U-shaped cover having one end disposed inside said internal fluid passage, and an inverted U-shaped header plate disposed over said end of said cover and said end of said at least one connecting flange such that said end of said cover and said end of said at least one connecting flange are disposed within an interior of said header plate, said header plate having a base with at least one oblong slot to receive at least one tube and longitudinal edges being parallel to each other and forming a longitudinal opening which, after assembly, said cover closes said longitudinal opening of said header plate which interacts with said cover to form said header, said cover having first walls being parallel to each other and extending toward said base of said header plate and contacting said longitudinal edges, said first walls having a length less than a length of said longitudinal edges, second walls extending inwardly at an angle toward the axis from said first walls and disposed adjacent said edge of said at least one connecting flange, and third walls extending axially away from said second walls and being disposed inside said internal fluid passage and contacting said at least one connecting flange, said third walls forming at least one external collar delimiting a hole for the flow of fluid, said at least one connecting flange having outer walls being parallel and recesses extending into an outer surface of said outer walls toward the axis before said edge, said longitudinal edges of said header plate being bent toward the axis and into said recesses of said outer walls to allow said edge of said at least one connecting flange to be secured at an angle onto said second walls of said cover by crimping said longitudinal edges to sandwich said edge of said at least one connecting flange between said second walls and said longitudinal edges, thereby bringing said internal passage into fluid communication with said hole in said at least one external collar,
   wherein said at least one external collar has a lateral wall thickness when disposed in said internal passage of said at least one connecting flange smaller than a lateral wall thickness of said second wall of said cover disposed in said header plate, thereby maximizing a cross section of said hole for the flow of fluid; and
   said header plate having a plurality of projecting stops extending inwardly from an internal surface of said longitudinal edges and axially toward the axis and said cover, one side of said projecting stops against which said first walls of said cover bears after assembly in order to seal said longitudinal opening of said header plate and on an opposite side of said projecting stops the at least one tube extending through said at least one oblong slot within the interior of said header plate bears after assembly.

2. The header as claimed in claim 1, wherein a reduction of the lateral wall thickness of said at least one external collar is at least 30% relative to the lateral wall thickness of said cover.

3. The header as claimed in claim 2, wherein a reduction of the lateral wall thickness of said at least one external collar is between 50% and 80% relative to the lateral wall thickness of said cover.

4. The header as claimed in claim 2, wherein said at least one connecting flange is crimped by using parallel edges delimiting said longitudinal opening of said header plate, which are bent onto said edge provided on said at least one connecting flange attached to said cover.

5. The header as claimed in claim 1, wherein a reduction of the lateral wall thickness of said at least one external collar is between 50% and 80% relative to the lateral wall thickness of said cover.

6. The header as claimed in claim 5, wherein said at least one connecting flange is crimped by using parallel edges delimiting said longitudinal opening of said header plate, which are bent onto said edge provided on said at least one connecting flange attached to said cover.

7. The header as claimed in claim 1, wherein said at least one connecting flange is crimped by using parallel edges delimiting said longitudinal opening of said header plate, which are bent onto said edge provided on said at least one connecting flange attached to said cover.

8. The header as claimed in claim 1, wherein an outer face of said first wall of said cover is provided with a coating for use in subsequent brazing of said cover with said header plate and said at least one connecting flange.

9. A heat exchanger comprising two headers interconnected by a bundle of parallel fluid flow tubes, wherein at least one of said headers is as claimed in claim 1.

10. A header for a heat exchanger comprising:
- an inverted U-shaped header plate having a base with at least one oblong slot to receive at least one tube and longitudinal sides being parallel to each other and forming a longitudinal opening;
- a fluid connecting flange having outer walls being parallel and including one end with an opening and opposed edges extending from said opening at an angle relative to an axis of said fluid connecting flange and disposed within said header plate, said outer walls including recesses extending into an outer surface of said outer walls toward the axis before said edges;
- a U-shaped cover having first walls being parallel to each other and extending toward said base of said header plate and contacting said longitudinal sides, said first walls having a length less than a length of said longitudinal sides and disposed within said header plate such that an end of said cover and an end of said fluid connecting flange are disposed within an interior of said header plate, second walls extending inwardly at an angle toward the axis from said first walls and disposed within said header plate and contacting said edges of said fluid connecting flange, and third walls extending axially away from said second walls and forming an opening opposite said base of said header plate and contacting said fluid connecting flange and a collar extending axially away from said second walls and disposed within said opening of said fluid connecting flange and delimiting an aperture for the flow of fluid;
- said longitudinal sides of said header plate having edges being bent toward the axis and into said recesses of said outer walls to allow said edges of said fluid connecting flange to be secured at an angle onto said second walls of said cover to sandwich said edges of said fluid connecting flange between said second walls and said longitudinal sides, thereby bringing said opening into fluid communication with said aperture in said collar;
- wherein said collar has a lateral wall thickness smaller than a lateral wall thickness of said second wall of said cover, thereby maximizing a cross section of said aperture for the flow of fluid; and
- said header plate having a plurality of projecting stops extending inwardly from an inner surface of said longitudinal sides and axially toward the axis and said cover, one side of said projecting stops against which said first walls of said cover bears after assembly in order to seal said longitudinal opening of said header plate and on an opposite side of said projecting stops the at least one tube extending through said at least one oblong slot within an interior of said header plate bears after assembly.

\* \* \* \* \*